July 14, 1964     R. B. HOUGHTON ETAL     3,140,612
ULTRASONIC SENSOR DEVICE

Filed Sept. 8, 1961     2 Sheets-Sheet 1

INVENTORS
FRANK P. DE LUCA
RICHARD B. HOUGHTON
BY Allen E. Botney
ATTORNEY

July 14, 1964     R. B. HOUGHTON ETAL     3,140,612
ULTRASONIC SENSOR DEVICE
Filed Sept. 8, 1961     2 Sheets-Sheet 2

FRANK P. DE LUCA
RICHARD B. HOUGHTON
INVENTORS

BY *Allen E. Botney*

ATTORNEY

3,140,612
ULTRASONIC SENSOR DEVICE
Richard B. Houghton and Frank P. De Luca, Los Angeles, Calif., assignors to Electro-Sonic Systems, Inc., Los Angeles, Calif., a corporation of California
Filed Sept. 8, 1961, Ser. No. 136,909
14 Claims. (Cl. 73—398)

The present invention relates in general to devices used to measure such physical quantities as velocity, acceleration, pressure, temperature, and the like, and more particularly relates to devices of the type mentioned that employ ultrasonic techniques in a novel manner to provide for the precise measurement of such quantities.

As is well known, it is oftentimes necessary to monitor and continuously measure such variable phenomena as acceleration, pressure, displacement, etc., whether it be at the earth's surface, in the atmosphere, or in outer space. For this purpose, devices commonly referred to as sensing devices are used. Generally speaking, one of the difficulties encountered in connection with prior art devices of this kind is that, in accordance with the needs of present day technology, they cannot respond as rapidly as may be desired. As a result, a time lag is introduced between the actual value of the quantity to be measured and the measurement presented, thereby introducing some degree of error. A further limitation of earlier sensing devices may be found in the fact that they are not customarily sensitive enough to detect very small variations. An additional disadvantage of existing devices is that they are analog in nature and, hence, additional apparatus is usually required to convert their analog outputs to some digital form, thereby increasing the expense, complexity, weight and volume of the overall equipment.

It is, therefore, an object of the present invention to provide a highly precise sensing device for the measurement of physical conditions, such as acceleration and pressure.

It is another object of the present invention to provide a sensing device that is sensitive enough to accurately measure very small fluctuations of the conditions to be measured.

It is a further object of the present invention to provide a sensing device that may readily be adapted to produce either digital or analog outputs in their measurement of inertial and thermodynamic variables.

The present invention substantially overcomes the mentioned disadvantages of prior art devices and, therefore, fulfills the stated objects through the use of ultrasonic techniques or, stated differently, by using the velocity of sound as a yardstick. The basic device comprises four piezoelectric crystals or magnetostrictive transducers arranged in an ultrasonic bridge in which two of the crystals or transducers are transmitters and two are receivers. Motion of a double corner reflector from its equilibrium position produces a relative phase change between the output signals from the two receiver crystals or transducers which, if the signals are digital in nature, manifests itself as a repeating double pulse whose interpulse spacing is proportional to the degree of ultrasonic phase unbalance and, hence, proportional to the displacement of the reflector from equilibrium. In essence, the sound wave arriving via one path is used to measure the time of arrival of the wave traveling the other path. Thus, the relative time delay change is proportional to the relative path length change and, hence, is directly proportional to the change in position of the double reflector. Since the reflector is displaced in response to changes in the conditions to be measured, namely, velocity, acceleration, pressure, etc., the time delay change is ultimately directly proportional to changes in the aforesaid conditions.

A sensing device according to the invention is sufficiently fast-acting and sensitive that it can be used to accurately measure position changes, that is, displacements, in the order of or smaller than a microinch. For example, a displacement of the reflector toward the crystal or transducer elements shortens one acoustical path by twice the displacement and lengthens the other path by the same amount. Thus, a displacement by "$x$" results in a phase shift in the signals to be compared which corresponds to an acoustical path change equal to $4x$. Hence, the phase shift will be given by the equation $$\Delta\phi = \frac{2\pi}{\gamma} 4x \text{ radians} = \frac{360°}{\gamma} 4x$$

where $\gamma$ is the acoustical wavelength. At a frequency of one megacycle per second, the wavelength for typical fluids is approximately 0.13 centimeters. In this example, therefore, the phase change for a linear displacement of "$x$" is approximately given by the equation $$\Delta\phi = 10^4 \times \frac{\text{degrees}}{\text{centimeter}}$$

State-of-the-art phase detection circuitry can easily detect phase changes of less than one degree. Hence, letting $$\Delta\phi = 0.25°$$

in the equation yields a displacement sensitivity of $\Delta x = 2.5 \times 10^{-5}$ centimeters $= 10^{-5}$ inches. The preceding calculation indicates that the acoustic position sensor is capable of detecting a relative displacement as small as one-hundred-thousandth of an inch at a frequency of one megacycle per second. The use of frequency multiplication techniques and/or the use of higher ultrasonic frequency leads to at least an order of magnitude increase in sensitivity.

In the matter of sensitivity, it should be noted that in principle only one pair of transducer elements, namely, piezoelectric crystals or magnetostrictive transducers, need be used to sense small changes in the position of an object where the sensing is done by comparing the phase of an ultrasonic wave directed at the object with the phase of the wave reflected from the object. However, in such a case, compensation would be required for the effect of the radiation pressure upon the object. Thus, by using two pairs of transducer elements, the radiation pressure is cancelled out and, thereby, the sensitivity of the system is doubled.

A further advantage of the present invention is that ultrasonic detection schemes of the type involved herein can easily and effectively be integrated with digital data processing circuitry to provide a high reliability system with digital readout. Thus, by way of example, a completely ultrasonically sensed system is ideally suited to a time-sharing telemetry system by virtue of the fact that a single digital readout system could be used in conjunction with a large number of such reliable compact sensors. An additional desirable feature of such a system would be that the necessity for an analog-to-digital data conversion stage for each transducer would be eliminated.

The novel features which are believed to be characteristic of the invention both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

FIG. 1 illustrates the basic construction of one embodiment of the invention;

FIG. 2 presents another embodiment of the invention for sensing changes in acceleration;

Figure 1:
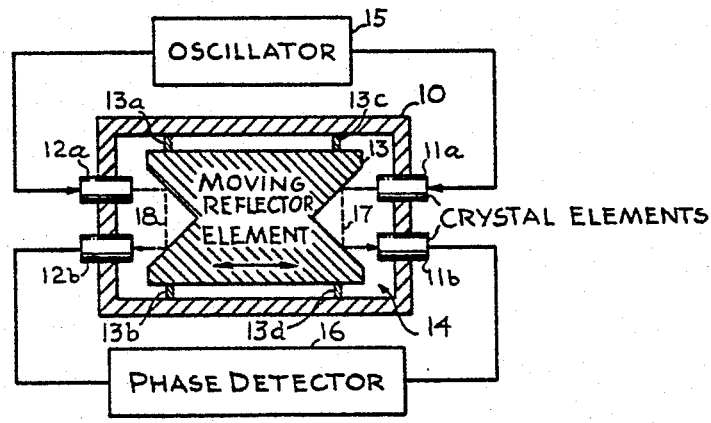

Reference is now made to the drawings and in particular to FIG. 1 wherein a basic embodiment of the invention, namely, a position-sensing device, is shown to include a fluid-containing tank 10 that is preferably a rectangular cylinder in its configuration. A pair of transducer elements is mounted on each end of the tank, the transducer elements on one end of the tank being designated 11a and 11b and these on the other hand being similarly designated 12a and 12b. The transducer elements may be either piezoelectric crystals or magnetostrictive devices but the crystals are used herein for purposes of description. As will be seen more clearly later, crystals 11a and 12a are utilized as transmitters, while crystals 11b and 12b, on the other hand, are used as receivers. A double corner reflector 13 is mounted in tank 10 between elements 11 and 12, "double corner" meaning that the ends of the reflector facing crystal elements 11 and 12 are 90° V-shaped. Reflector 13 is mounted by means of parallelogram leaf springs 13a–13d which are designed to permit linear displacement of the reflector but with lateral restraint. The normal or quiescent position of the reflector is exactly midway between the crystals, and the material from which the reflector is made depends upon the particular fluid in which it is immersed. In selecting a reflector material, the objective, of course, is to achieve a high reflection coefficient. In this connection, it has been experimentally observed that the reflection coefficient is substantially unity for sound waves incident on a steel surface at an angle greater than 20° from normal incidence.

Considering reflector 13 still further, the reflecting surfaces should be flat to within $\gamma/10$, where $\gamma$, as heretofore mentioned, is the wavelength of the acoustical wave. However, since $\gamma$ may be equal to 0.13 cm., as previously indicated, this condition is easily satisfied. In mounting the reflector, it is desirable to obtain a mechanical suspension which will provide freedom of motion along only one axis, namely, in the direction of crystal elements 11 and 12. This sort of mounting is easily within the skill of the mechanical arts and is not shown in the figure for sake of clarity. As for the fluid contained by tank 10 and in which reflector 13 is suspended, the fluid or acoustic medium is preferably one that exhibits the properties of low ultrasonic attenuation and high shear viscosity, the latter quality of the fluid being useful for mechanical damping of the reflector which, it will be recognized, is an inertial mass. Such damping is especially useful in accelerometer applications of the invention. The fluid is designated 14 in the figure and the properties desired for it may, for example, be obtained over a limited frequency range by loading a low viscosity organic monomer with a polymer that has a high value of shear viscosity.

Finally, crystals 11a and 11b are electrically connected by means of a pair of wires to an oscillator 15 and crystals 11b and 12b are similarly connected to a phase detector 16. The oscillator may be one which generates a continuous wave or one which generates pulsed energy instead, since the system will operate under either circumstance.

Considering now the operation, ultrasonic position transduction is accomplished by measuring the phase difference between two ultrasonic waves reflected from opposite faces of movable corner reflector 13. More specifically, oscillator 15 generates an electrical signal that is simultaneously applied to crystal elements 11a and 12a, the crystals converting the electrical signal to a corresponding pair of acoustical signals that are transmitted by them through fluid 14 to reflector 13. The acoustical signals are reflected by the reflector to receiver crystals 11b and 12b, the paths respectively taken by the two waves being indicated by the two sets of broken lines designated 17 and 18. Crystals 11b and 12b convert the acoustical signals back to electrical signals which are then applied to phase detector 16.

When reflector 13 is in its quiescent position, that is, when it is exactly midway between crystals 11 and 12, paths 17 and 18 are of equal length so that the two aforesaid waves are received by crystals 11b and 12b at exactly the same moment, with the result that the output of phase detector 16 is zero. On the other hand, any displacement of the reflector from its quiescent position causes the two paths to be of unequal length and, in consequence thereof, the two waves arrive at receiver crystals 11b and 12b at different times. In this case, phase detector 16 produces an output signal whose magnitude is proportional to the difference in phase or time of arrival of the two signals and, therefore, is proportional to the displacement of the reflector. Thus, by obtaining an accurate measure of phase difference, the displacement of reflector 13 can be measured precisely. As was previously mentioned, displacements in the order of a microinch can be accurately measured in this way.

It should be mentioned with respect to the position-sensing device described above that if it is desired to monitor the position of a controlled surface linkage or of a valve member or the orientation of a rocket engine relative to a vehicle, the task can be accomplished simply by linking the moving member whose position is to be monitored to the movable double corner reflector of the ultrasonic module.

Figure 2:
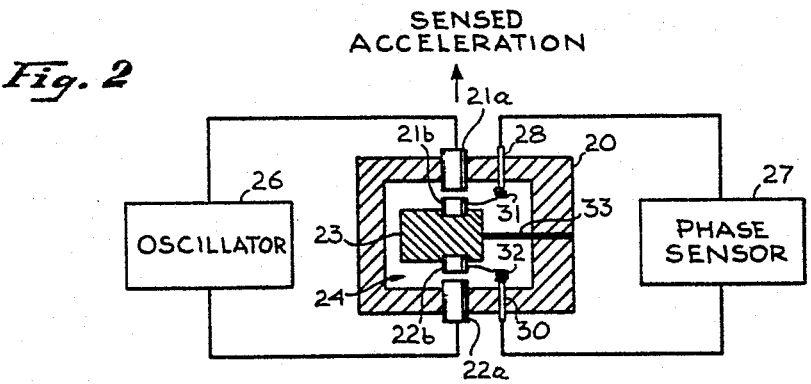

The position-sensing device of FIGURE 1 may be modified to provide an acceleration sensing device or, as it is commonly known, an accelerometer. One such accelerometer is shown in FIGURE 2 and includes, as before, a fluid-containing tank 20, a pair of transmitter crystals 21a and 22a, a pair of receiver crystals 21b and 22b, a movable mass 23, an appropriate acoustic medium or fluid 24, an oscillator 26 and a phase detector 27. With respect to tank 20, fluid 24, oscillator 26 and phase detector 27, these items may be the same as those set forth and described in connection with the FIG. 1 embodiment and, therefore, are not described here again in any detail in order to avoid being redundant. As for crystals 21 and 22 and movable mass 23, the mass is not used as a reflector but rather as a mounting and carrier for receiver crsytals 21b and 22b.

More specifically, in this device transmitter crystals 21a and 22a are mounted in opposite walls of tank 20, receiver crystals 21b and 22b being mounted on opposite sides of mass 23 in face-to-face relationship with the transmitter crystals, as shown in the figure. The transmitter crystals are connected by means of a pair of electrical leads to oscillator 26, the receiver crystals being similarly connected to phase detector 27. The connections between receiver crsytals 21b and 22b and phase sensor 27 are made through the walls of tank 20, a pair of tubes 28 and 30 being inserted in the walls at the appropriate places to permit easy passage of the electrical leads therethrough. Of course, the ends of tubes 28 and 30 are sealed about the leads to prevent escape of any fluid 24. Intermediate tubes 28 and 30 and receiver crystals 21b and 22b, the electrical leads are coiled for the purpose of providing slack so as to obtain the greatest degree of freedom of motion for mass 23 and the transducers mounted thereon, the two abovesaid coils being designated 31 and 32. Finally, the FIG. 2 embodiment also includes a cantilever type of spring or flexural element 33 mechanically intercoupling movable mass 23 and a wall of tank 20. More particularly, as shown in the figure, flexural element 33 projects at right angles from the tank wall, mass 23 being rigidly mounted on the "free"

end of the flexural element, and, therefore, is supported by this element which is made of a material having a desirable spring constant, such as, for example, beryllium copper.

In considering the operation, it should first be mentioned that the restoring force which tends to return sensing mass 23 to its equilibrium or quiescent position is provided by elastic or flexural element 33. It should also be mentioned that in this kind of accelerometer the expected accelerations are of an order of magnitude such that the mass is displaced only slightly from equilibrium, the result being, as will be seen below, that the acceleration is linearly proportional to the displacement since the behavior of the suspension is then entirely elastic.

Accordingly, the relationship between the restoring force, F, and the displacement from equilibrium, $x$, is given by the equation $$F = -k(x,T)x$$

where T is the temperature and $k$ describes the elastic properties of elastic member 33. It may be said in general that $k$ is a function of the displacement and temperature. If $k$ is considered to be constant for the particular elastic member employed, the relationship between the acceleration, $a$, and the displacement of the mass is given by $$a = \frac{F}{m} = \frac{-k}{m}x$$

Thus, the acceleration is proportional to the displacement and an accurate determination of the acceleration may be made by making an accurate measurement of the displacement.

The operation of the accelerometer is basically the same as the displacement sensing device of FIG. 1. Hence, as before, the electrical signal generated by oscillator 26 at some predetermined ultrasonic frequency is converted by transmitter crystals 21a and 22a to corresponding acoustical signals. The latter signals are propagated through fluid 24 to receiver crystals 21b and 22b whereat they are reconverted to electrical signals which are then applied to phase detector 27. With mass 23 exactly centered between crystals 21a and 22a, that is, with the mass in its quiescent position, the reconverted signals arrive at phase detector 27 at exactly the same time. Under such conditions, the detector output is zero. However, when the apparatus experiences an acceleration, mass 23 is subjected to a force which causes it to be displaced from its quiescent position until the force due to the acceleration and the restoring force exerted by flexural element 33 are equal. In this case, the path length between crystals 21a and 21b will be different from that between crystals 22a and 22b, with the result that the reconverted signals will then arrive at phase detector 27 at different times, that is, out of phase with each other. Consequently, phase detector 27 will produce an output voltage whose magnitude or phase difference will be an accurate measure of the displacement of mass 23, the magnitude of the output voltage thereby also providing an accurate measure of the acceleration for the reasons previously explained. When the acceleration is reduced to zero, mass 23 will return to its quiescent position and the phase detector output will also be reduced to zero.

Figure 3:
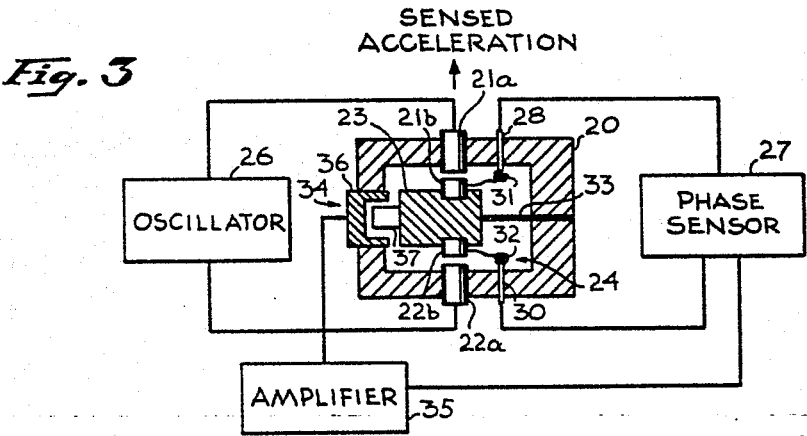
FIG. 3 shows a modified arrangement of the embodiment in FIG. 2.

The accelerometer apparatus of FIGURE 2 may be modified to include a network which generates a restoring force to return the mass to its reference or quiescent position and hold it there. An accelerometer modified in this way is shown in FIG. 3 and may be termed a force-balance servo accelerometer. As shown, this type of accelerometer includes all the elements of the FIG. 2 accelerometer in the same arrangement and further includes a force generator, generally designated 34, and an amplifier 35 coupled between phase detector 27 and force generator 34. In essence, force generator 34 includes a U-shaped member 36 mounted in the wall of tank 20, member 36 being positioned and oriented in such a manner that its jaw opens toward mass 23. A coil wound about member 36 is connected to the output end of amplifier 35 and when current is circulated through the coil by the amplifier, a magnetic field is produced between the jaws of this member whose strength is proportional to the magnitude of the circulating current, the larger the current the stronger the magnetic field. Force generator 34 also includes a magnet 37 for producing a fixed magnetic field, member 37 being mounted on the end of mass 23 that faces member 36 and being of a length such that it projects into the jaws of member 36.

In operation, when an acceleration force causes displacement of the sensing mass from its reference or quiescent position, the network comprising phase detector 27, amplifier 35 and force generator 34 generates a restoring force to return the sensing mass to its reference position and hold it there. The restoring force is the result of the interaction between the fixed magnetic field, B, produced by member 37 and the forcing current, I, which circulates through the coil wound on member 36 and which is controlled by the nulling servo made up of phase detector 27 and amplifier 35. The relationship between the acceleration and the forcing current may be given by the equation $$a = \frac{CB}{m} \times I$$

where C is a constant of proportionality and $m$ is the sensing mass. Since B is fixed, it will be seen from the equation that "$a$," the acceleration, is directly proportional to I, the forcing current. Thus, by accurately metering the acceleration may be very accurately determined. The current itself will vary with the output from phase detector 27 and since the manner in which the detector output will vary and the reasons therefor were previously described in detail, no further description of such details is deemed necessary here.

Figure 4:
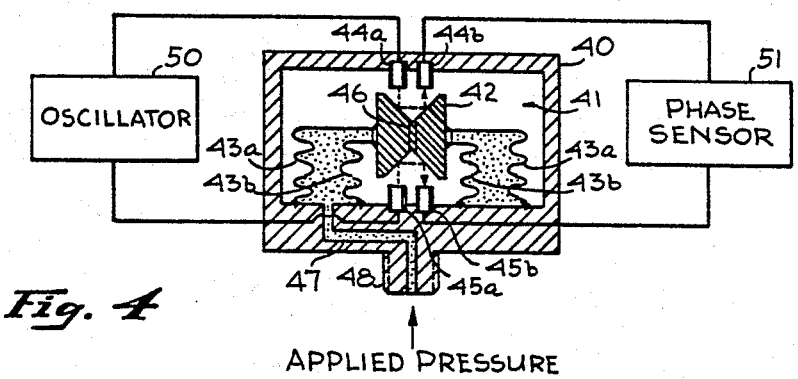
FIG. 4 illustrates an embodiment of the invention for sensing changes in pressure.

Another embodiment of the present invention for sensing changes in pressure is shown in FIG. 4 and, as illustrated therein, the embodiment includes a tank 40, as well as an acoustical medium or fluid 41, a movable reflector element 42, cylindrically-shaped concentric bellows members 43a and 43b, a pair of transmitter crystals 44a and 45a, and a pair of receiver crystals 44b and 45b, either mounted or contained within the walls of the tank. More specifically, crystals 44a and 44b are mounted on one wall of tank 40 and crystals 45a and 45b are mounted on an opposite wall, reflector mass 42 being suspended therebetween with the ends of the reflector facing the crystal elements being 90° V-shaped as in the FIG. 1 embodiment. For reasons that will be clearer later, it is essential that fluid 41 be permitted to pass through reflector 42 and for this purpose a tubular-shaped orifice extends through the center portion of the reflector from one double corner to the other, as shown in the figure. Reflector 42 is mounted in the hollow of bellows 43b, that is, between its inner walls, and is fixed to the bellows so that the reflector will move forward or back as the bellows respectively expands or contracts. The space between bellows 43a and 43b is filled with gas which is prevented from entering or leaving the bellows except via an opening or channel 47 through a wall of the tank. One side of the tank wall has a shaftlike protrusion 48 which is threaded for connection to external apparatus whose pressure fluctuations are to be measured, channel 47 extending from the area between bellows 43a and 43b through the tank wall and protrusion 48 to the external apparatus.

As before, transmitter crystals 44a and 45a are electrically connected to an oscillator 50 while crystals 44b and 45b are electrically connected to a phase detector 51.

In considering the operation, it will be assumed that reflector 42 is initially in a quiescent position as that term has hereinbefore been defined. If now the external pressure being monitored should increase in value, the increased external pressure will be reflected in an increase in gas pressure between bellows 43a and 43b which, in turn, will cause the bellows to expand. The expanding bellows will, therefore, carry reflector 42 closer to crystals 44a and 44b, with the result that the path length from crystal 44a to reflector 42 and back to crystal 44b, as indicated by the broken line, will be decreased, the path length from crystal 45a to reflector 42 and back to crystal 45b thereby being correspondingly increased. It will be remembered from the operations of the devices previously described that in such a case phase detector 51 produces an output signal whose magnitude will provide an accurate measure of the pressure change. Should the external pressure decrease, on the other hand, then in that event bellows 43a and 43b will contract, the change in the phase detector output again reflecting the external pressure change. Of course, so long as reflector 42 is in its quiescent position, the phase detector output is zero.

With respect to orifice 46 through reflector 42, this opening is required in order to minimize errors due to inertial effects or, stated differently, to permit fluid 41 to pass through reflector 42 as the reflector moves forward and backward, thereby preventing the building up of back pressures that would ordinarily introduce such errors. Furthermore, the response time or upper frequency of operation is improved due to the reduced total mass of the system.

Figure 5A:
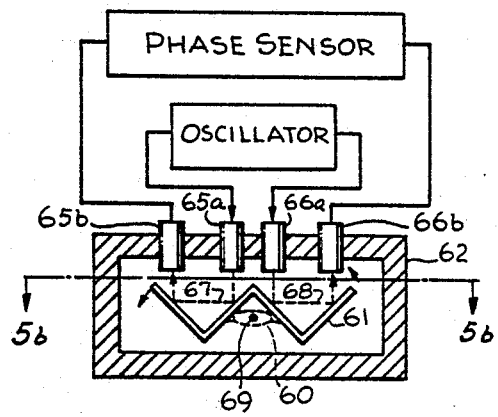
FIGS. 5(a) and 5(b) illustrates still another embodiment of the invention for sensing changes in pressure.
Figure 5B:
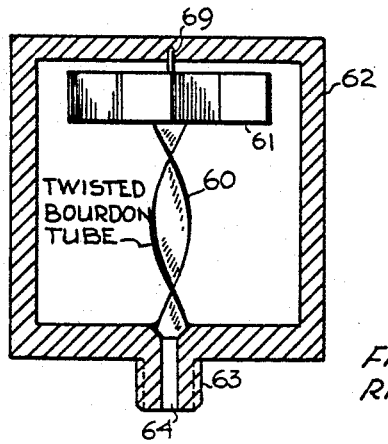

Another arrangement of a pressure-sensing device according to the present invention is shown in FIGS. 5a and 5b and includes a twisted Bourdon tube 60 mechanically linked at one end to a W-shaped reflector mass 61 and coupled at the other end to an opening through the wall of tank 62. More specifically, an externally threaded member 63 that is integral with and extends from the tank is provided for making connection to external apparatus whose pressure variations are to be monitored and measured, the center of member 63 having an opening 64 that couples the Bourdon tube to the outside. In this embodiment, all four transducer elements are mounted on the same wall of the tank with the receiver crystals, namely, crystals 65b and 66b, being positioned near the extremities of the reflector and the transmitter crystals, namely, crystals 65a and 66a, being positioned between them, that is, on either side of the center angle of the W. The signal paths between the transmitter and receiver crystals are designated 67 and 68. For stability and support, reflector 61 may be rotatably supported by mechanism 69 which extends into the tank wall above the reflector.

In operation, an increase or decrease in the pressure inside the hollow Bourdon tube relative to the pressure outside causes the twisted tube to rotate in one direction or another. As will be recognized, reflector 61 will be caused to rotate in the same direction as the tube. As a result, signal paths 67 and 68, which are normally of equal length, become unequal in length. This, in turn, for the reasons previously explained, causes the phase detector to produce a signal that provides an accurate measure of the pressure change.

It was mentioned much earlier that the present invention may also be applied for flow metering purposes or used for temperature sensing. With respect to flow metering, the flow of a fluid through a tube can be measured by constructing the tube at one point into a Venturi configuration and then measuring the reduction in pressure which occurs in a Venturi tube connected to the constricted area. The bellows pressure sensor described earlier is ideally suited to this application and it provides a digital output signal which may conveniently be related to the rate of fluid flow if the thermodynamic and physical properties of the fluid are known.

Finally, it should be mentioned that all of the ultrasonic sensing techniques and apparatus described herein are capable of being used in a system in which a single oscillator and a single compact data processor are programed on a time-sharing basis to sample a large number of independent variables. Consequently, adaptations of the present invention should find wide application in the fields of telemetry and guidance by virtue of its ruggedness, simplicity and inherent reliability.

Having thus described the invention, what is claimed as new is:

1. A sensor device comprising: a hollow structure adapted to contain a fluid, a fluid medium capable of readily propagating sonic and ultrasonic waves filling the hollow of said structure; an element mounted in said fluid medium in such a manner as to be displaceable along the line of propagation of the waves in response to forces applied to it; first means for transmitting a pair of acoustical signals at a frequency selected from the sonic and ultrasonic frequency range through said fluid medium to opposing surfaces of said element; and second means for detecting the times of arrival of said acoustical signals at said element, the time lag between said pair of signals being a measure of the displacement of said element from its normal position.

2. A sensor device comprising: a hollow structure adapted to contain a fluid, a fluid capable of readily propagating sonic and ultrasonic waves filling the hollow of said structure; an element mounted in said fluid medium equidistantly from the sides of said structure, said element being mounted in such a manner that it is displaceable from its central position along the line of propagation of the waves in response to forces acting on said element in the direction of said line; an oscillator for generating an electrical signal at a frequency selected from the sonic and ultrasonic frequency range; first means coupled between said oscillator and said fluid medium, said first means being energizeable in response to said electrical signal to transmit a pair of acoustical signals at said selected frequency through said fluid medium to opposite ends of said element; and second means for detecting the times of arrival of said acoustical signals at said element, the time lag between said pair of signals being a measure of the displacement of said element from its central position.

3. A sensor device comprising: a hollow housing structure adapted to contain a fluid, a fluid capable of readily propagating sonic and ultrasonic waves filling the hollow of said structure; an oscillator for generating an electrical signal at a frequency selected from the sonic and ultrasonic frequency range; a first pair of transducers respectively mounted in opposite walls of said housing structure and coupled between said oscillator and said fluid medium, said first pair of transducers being energizeable in response to said electrical signal to convert said electrical signal to a pair of corresponding acoustical signals that are transmitted toward each other through said medium; a second pair of transducers respectively mounted in said walls and coupled to said fluid medium, said second pair of transducers being operable to convert acoustical signals applied thereto to corresponding electrical signals; an element mounted between said first and second pairs of transducers in said fluid medium and adapted to reflect the acoustical signals from said first pair of transducers to said second pair of transducers, said element being mounted to be unidirectionally displaceable along the line of propagation of the waves from a quiescent position in response to forces acting upon it; and a phase-detector mechanism coupled to said second pair of transducers for measuring the time lag between electrical signals therefrom, said measurement being a measure of the displacement and the force acting upon said element.

4. The sensor device defined in claim 3 wherein said element is rectangular shaped with the ends thereof facing said transducers being 90° V-shaped.

5. A sensor device comprising: a hollow housing structure adapted to contain a fluid, a fluid capable of readily propagating sonic and ultrasonic waves filling the hollow of said structure; first means coupled to said fluid medium for transmitting a pair of acoustical signals therethrough from opposite ends of said structure and at a frequency selected from the sonic and ultrasonic frequency range; a rectangular-shaped element mounted in said fluid medium and having its ends 90° V-shaped to reflect the acoustical signals received from said first means, said element being mounted to be unidirectionally displaceable along the line of propagation of said signals from a quiescent position in response to forces acting upon it; and second means coupled to said fluid medium for measuring the difference in the times of arrival thereat of said reflected acoustical signals, said measurement being a measure also of the forces acting on said element.

6. A sensor device comprising: a hollow housing structure adapted to contain a fluid, a fluid capable of readily propagating sonic and ultrasonic waves filling the hollow of said structure; an oscillator for generating an electrical signal at a frequency selected from the sonic and ultrasonic frequency range; a first pair of transducers respectively mounted in opposite walls of said housing structure and coupled between said oscillator and said fluid medium, said first pair of transducers being energizeable in response to said electrical signal to convert said electrical signal to a pair of corresponding acoustical signals that are transmitted toward each other through said medium; means for receiving said pair of acoustical signals and for converting them to a corresponding pair of electrical signals mounted in said fluid medium between said transducers, said means normally being positioned equidistantly from said transducers and mounted in such a manner as to be displaceable toward either one of them in response to forces acting upon it; and a phase-detector mechanism coupled through said housing structure and said fluid medium to said means for measuring the time lag between the pair of electrical signals therefrom, said measurement being a measure of the displacement and the force acting upon said means.

7. The sensor device defined in claim 6 wherein said means includes an element displaceably mounted in said medium between said first pair of transducers; and a second pair of transducers for converting acoustical signals to corresponding electrical signals rigidly mounted on said element respectively facing said first pair of transducers.

8. A sensor device comprising: a hollow tank structure having an orifice through one wall thereof; an oscillator for generating an electrical signal at a frequency selected from the sonic and ultrasonic frequency range; a first pair of transducers for converting the electrical signal to a pair of corresponding acoustical signals respectively mounted in opposite walls of said tank structure facing the hollow thereof; a phase-detector mechanism for measuring the difference in phase between electrical signals applied to it; a second pair of transducers for converting acoustical signals applied to them into corresponding electrical signals respectively mounted in the same opposite walls of said tank structure facing the hollow thereof as said first pair of transducers; means adapted to respectively reflect the acoustical signals from said first pair of transducers to said second pair of transducers, said means normally being centrally positioned between said first and second pairs of transducers and mounted in such a manner as to be unidirectionally displaceable along the line of propagation of said acoustical signals from said central position in response to a force applied to it; a pair of concentric bellows members coupled to said means at one end and mounted over said orifice at the other end, said bellows members being operable to expand and contract in said unidirection in response to pressures externally applied to said orifice; and a fluid medium capable of readily propagating sonic and ultrasonic waves filling the unoccupied portions of the hollow of said tank.

9. The sensor device defined in claim 8 wherein said means includes a rectangular-shaped plate with the two sides thereof facing the transducers being 90° V-shaped and the other two sides thereof being coupled to said bellows members, said plate having an orifice therethrough to permit unrestricted passage of said fluid medium as said bellows members expand and contract.

10. A sensor device comprising: a hollow tank structure having an orifice through one wall thereof, a fluid capable of propagating acoustical waves contained in the hollow of said structure; an oscillator for generating an electrical signal at a frequency selected from the sonic and ultrasonic frequency range; a W-shaped member rotatably mounted in said fluid and facing another wall of said tank structure; a first pair of transducers coupled between said oscillator and said fluid, said first pair of transducers being energizeable in response to said electrical signal to convert said electrical signal to a pair of corresponding acoustical signals, said first pair of transducers being mounted in said other tank wall and in registration with the two outer walls of said W-shaped member, whereby said acoustical signals are respectively transmitted to said two outer walls and reflected therefrom to the two inner walls of said member from which said acoustical signals are again reflected; a phase-detector mechanism for measuring the difference in phase between electrical signals applied to it; a second pair of transducers electrically connected to said phase-detector mechanism and mounted in contact with said fluid for respectively converting said pair of acoustical signals into a pair of corresponding electrical signals and applying them to said mechanism, said second pair of transducers being mounted in said other tank wall and in registration with the two inner walls of said member, whereby the acoustical signals reflected from said inner walls are respectively received by said transducers; and a twisted Bourdon tube coupled between said W-shaped member and the orifice through said tank wall, said tube being operable to furl and unfurl to respectively rotate said member in one direction and the other in response to different pressures externally applied to said orifice.

11. A sensor device comprising: a hollow housing structure adapted to contain a fluid, a fluid capable of readily propagating sonic and ultrasonic waves filling the hollow of said structure; an oscillator for generating an electrical signal at a frequency selected from the sonic and ultrasonic frequency range; a first pair of transducers respectively mounted in opposite walls of said housing structure and coupled between said oscillator and said fluid medium, said first pair of transducers being energizeable in response to said electrical signal to convert said electrical signal to a pair of corresponding acoustical signals that are transmitted toward each other through said medium; means for receiving said pair of acoustical signals and for converting them to a corresponding pair of electrical signals mounted in said fluid medium between said transducers, said means normally being positioned equidistantly from said transducers and mounted in such a manner as to be displaceable toward either one of them in response to forces acting upon it; a phase-detector mechanism coupled through said housing structure and said fluid medium to said means for producing an output signal whose magnitude and polarity are a measure of the time lag between the pair of electrical signals produced by said means, said output signal thereby being a measure of the displacement force acting on said means; and additional means coupled between said phase-detector mechanism and said means for applying a restoring force to said means equal to said displacement force in response to said output signal, whereby said means is ultimately retained in its central position, said additional means including apparatus for measuring the restoring force and, therefore, the displacement force.

12. The sensor device defined in claim 11 wherein said means includes an element displaceably mounted in said medium between said first pair of transducers; and a second pair of transducers for converting acoustical signals to corresponding electrical signals rigidly mounted on said element respectively facing said first pair of transducers.

13. The sensor device defined in claim 11 wherein said additional means includes an amplifier coupled to receive said output signal, and a force generator mounted in a wall of said tank structure and coupled between said amplifier and said means.

14. The sensor device defined in claim 12 wherein said additional means includes an amplifier coupled to receive said output signal, and a force generator mounted in a wall of said tank structure and coupled between said amplifier and said element.

References Cited in the file of this patent
UNITED STATES PATENTS

| | | |
|---|---|---|
| 2,025,719 | Blaue et al. | Dec. 31, 1935 |
| 2,640,190 | Rines | May 26, 1953 |
| 2,985,018 | Williams | May 23, 1961 |